Jan. 28, 1958 A. S. OSTENSO ET AL 2,821,675
SATURABLE REACTOR MOTOR DRIVE
Filed March 7, 1957 2 Sheets-Sheet 1

INVENTORS
ARTHUR OSTENSO
HENRY NEWBURGH
BY
ATTORNEYS

Jan. 28, 1958  A. S. OSTENSO ET AL  2,821,675
SATURABLE REACTOR MOTOR DRIVE
Filed March 7, 1957  2 Sheets-Sheet 2

INVENTORS
ARTHUR OSTENSO
HENRY NEWBURGH
BY
ATTORNEYS

United States Patent Office

2,821,675
Patented Jan. 28, 1958

2,821,675

SATURABLE REACTOR MOTOR DRIVE

Arthur S. Ostenso, China Lake, and Henry Newburgh, Ridgecrest, Calif., assignors to the United States of America as represented by the Secretary of the Navy Application March 7, 1957, Serial No. 644,698

2 Claims. (Cl. 318—254)

(Granted under Title 35, U. S. Code (1952), sec. 266)

The invention described herein may be manufactured and used by or for the Government of the United States of America for governmental purposes without the payment of any royalties thereon or therefor.

The present invention relates to electric motors, and more particularly to a saturable reactor motor drive.

It is a general object of the present invention to provide an improved electric motor having a permanent magnet, which helps saturate a saturable reactor, rotated by the effective field produced at a drive coil by the saturable reactor.

Another object of the invention is to provide an improved electric motor of the saturable reactor type which is simple in design, provides constant torque and operates directly without benefit of an amplifier.

A further object of the invention is to provide an improved electric motor which is particularly suited for use in a gyroscope.

Other objects and many of the attendant advantages of this invention will be readily appreciated as the same become better understood by reference to the following detailed description when considered in connection with the accompanying drawings wherein:

Fig. 1 is a schematic diagram of the physical layout of a circuit of the present invention;

Fig. 2 is a curve of core flux vs. A. C. voltage;

Figure 1:
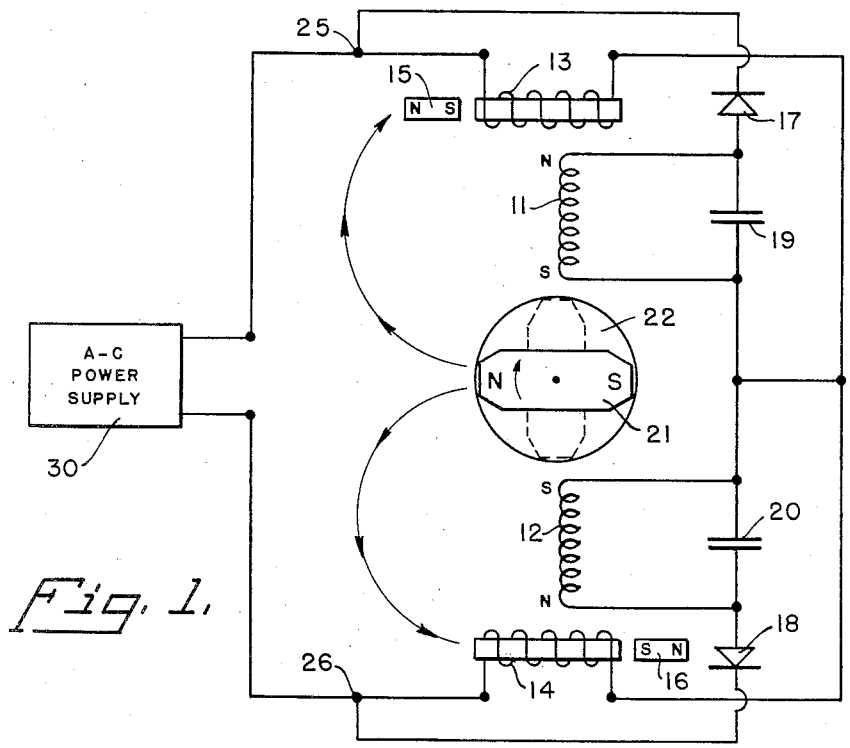

Referring now to the drawings where like numerals designate like parts in all of the figures, and more particularly to Fig. 1 of the drawings, 11 and 12 are motor drive coils, 13 and 14 are saturable reactors, 15 and 16 are bias magnets, 17 and 18 are diodes, 19 and 20 are filter condensers, and 21 is a permanent magnet on the back of a rotor 22 that forms the armature of a D. C. motor. Rotor 22 can be the rotor of a gyro, for instance. Two circuits as shown in Fig. 1 are actually used for the motor drive.

Figure 2:
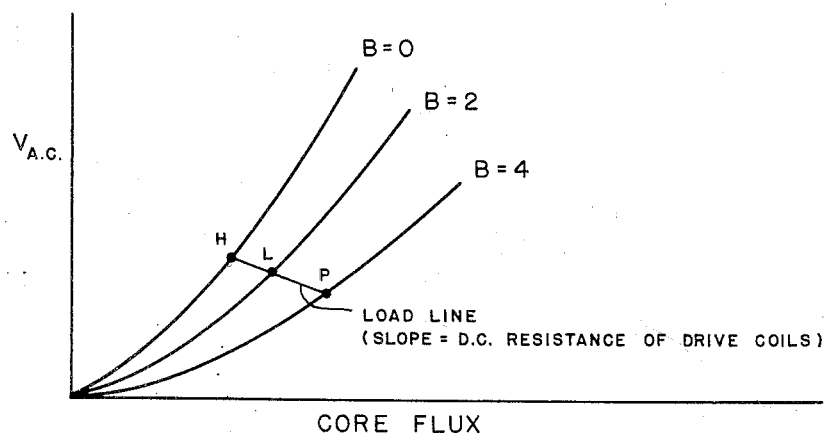

Bias magnets 15 and 16 are of such strength that they bias the cores of saturable reactors 13 and 14 to approximately mid-point flux density; this occurs at about point L in Fig. 2. As permanent magnet 21 rotates it causes external flux B in the saturable reactor cores to change. As this happens the circuit variables move along the load line H—L—P of Fig. 2. The core flux of the saturable reactors vary as the inductance, reactance, A. C. permeability and A. C. current in the coils. It is important that the A. C. voltage, $V_{A.C.}$ at this points 25 and 26 change as magnet 21 rotates. The circuit components are arranged so that the magnet 21 and rotor 22 rotate clockwise.

Considering now in greater detail the operation of the saturable reactor motor drive, it will be understood that flux leaves the north end of magnet 21 and enters the south end and as it does so the flux passes through the cores of saturable reactors 13 and 14 as illustrated in Fig. 1.

At saturable reactor 13, when magnet 21 is in the position as shown in Fig. 1, the strengths of the north end of magnet 21 and the north end of bias magnet 15 oppose each other and tend to cancel each others force. The variables of saturable reactor 13 then will move along the load line, H—L—P of Fig. 2, towards point H causing the voltage $V_{A.C.}$ at point 25, Fig. 1, to rise. This causes diode 17 to conduct, drawing a current $I_{D.C.}$ through drive coil 11 and causing rotor magnet 21 to rotate clockwise. Likewise, at saturable reactor 14, strengths of the north end of magnet 21 and the south end of bias magnet 16 add to each other so that the flux B increases and the variables of saturable reactor 14 move towards point P, on the load line H—L—P of Fig. 2, decreasing the voltage $V_{A.C.}$ and turning off diode 18.

If rotor magnet 21 is rotated 180 degrees then the flux B in saturable reactor 13 will be greater, the voltage $V_{A.C.}$ at point 25 will decrease and current $I_{D.C.}$ in drive coil 11 will go off. However, at the same time, the flux B in saturable reactor 14 will decrease, the voltage $V_{A.C.}$ at point 26 will increase, the current $I_{D.C.}$ in drive coil 12 will flow and the north end of magnet 21 will be drawn clockwise towards drive coil 12.

It can readily be seen from the above description that the saturable reactors 13 and 14 are in actuality a means of magnetic commutation. By properly choosing the diodes 17 and 18 or voltage $V_{A.C.}$ the device can be made to operate class-B for maximum efficiency.

The circuit of Fig. 1 shows only one half the circuitry; there are actually two such circuits connected across the power source 30. Two circuits as in Fig. 1 are necessary for self-starting and better operation because there is a dead spot, when magnet 21 is at a position 90 degrees clockwise from the position of magnet 21 in Fig. 1, shown in dotted lines. With the use of four drive coils, with their necessary circuitry as mentioned above, spaced 90 degrees apart, as shown in Fig. 3 the effect of the dead spot can be nullified. Four drive coils provide a balanced field for the magnet 21 to rotate in.

Figure 3:
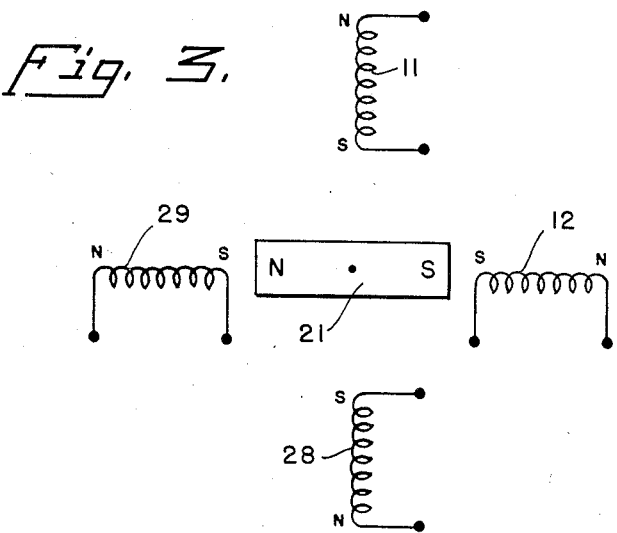
Fig. 3 is a schematic diagram showing four drive coils.
Figure 4:
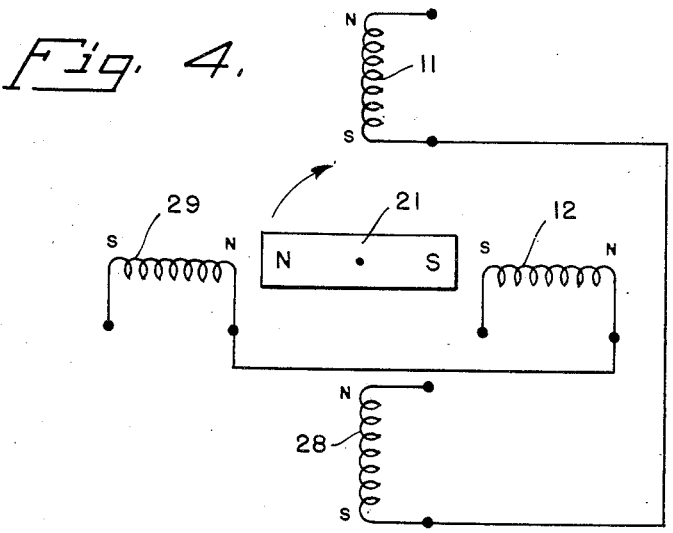
Fig. 4 is a schematic diagram showing four drive coils with opposite coils connected in tandem.

In Figs. 1 and 3 the drawings are such that there is a 90 degree leading south pole always ahead of the north end of the permanent magnet armature 21. For class-B operation it is recommended that the opposite drive coils have opposite polarity, as illustrated in Fig. 4, by connecting opposite coils in tandem.

In class-B operation each opposite pair of coils would be on for 180 degrees and off for 180 degrees. Drive coils 11 and 28 and drive coils 12 and 29 of Fig. 4 form pairs, and each pair of coils have 90 degree overlapping fields with each other which nullify the effect of dead spots, as previously mentioned.

Alternate methods of construction may be used, for instance, the drive coils may be connected in series or parallel, or magnetic type saturable reactors with D. C. feedback to provide gain therein may be used. By properly shaping the cores in the saturable reactors the maximum change in flux can be obtained through the saturable reactors, thereby producing maximum $V_{A.C.}$ change at points 25 and 26.

Obviously, many modifications and variations of the present invention are possible in the light of the above teachings. It is therefore to be understood that within the scope of the appended claims the invention may be practiced otherwise than as specifically claimed.

What is claimed is:

1. A saturable reactor motor drive for driving a rotor about an axis of rotation comprising an armature consisting of a permanent magnet mounted on a rotor, said permanent magnet having its poles located so that a straight line through the poles substantially intersects the axis of rotation of said armature, an A. C. power supply having first and second output terminals, a first diode having its anode connected to the first of said power supply terminals, a first drive coil and a first filter condenser connected together in parallel and connected between the cathode of said first diode and a common point, a first saturable reactor connected between the first of said power supply terminals and said common point, a second diode having its anode connected to the second of said power supply terminals, a second drive coil and a second filter condenser connected together in parallel and connected between the cathode of said second diode and said common point, a second saturable reactor connected between the second of said power supply terminals and said common point, said first and second saturable reactors being used for sensing the orientation of said permanent magnet and for directly energizing said first and second motor drive coils respectively to cause said armature to rotate, and a bias magnet mounted near each of said saturable reactors for biasing said saturable reactors to substantially mid-point flux density.

2. A saturable reactor motor drive for driving a rotor about an axis of rotation comprising an armature consisting of a permanent magnet mounted on a rotor, said permanent magnet having its poles located so that a straight line through the poles substantially intersects the axis of rotation of said armature, an A. C. power supply having first and second output terminals, two motor drive networks positioned at 90 degrees to each other and connected across the first and second terminals of said power supply; each said network consisting of a first diode having its anode connected to the first of said power supply terminals, a first drive coil and a first filter condenser connected together in parallel and connected between the cathode of said first diode and a common point, a first saturable reactor connected between the first of said power supply terminals and said common point, a second diode having its anode connected to the second of said power supply terminals, a second drive coil and a second filter condenser connected together in parallel and connected between the cathode of said second diode and said common point, a second saturable reactor connected between the second of said power supply terminals and said common point, said first and second saturable reactors in each network being used for sensing the orientation of said permanent magnet and for directly energizing said first and second motor drive coils respectively to cause said armature to rotate, and a bias magnet mounted near each of said saturable reactors for biasing said saturable reactors to substantially mid-point flux density.

References Cited in the file of this patent

UNITED STATES PATENTS

| | | |
|---|---|---|
| 2,512,325 | Hansen | June 20, 1950 |
| 2,797,376 | Meade | June 25, 1957 |